Nov. 2, 1926.

D. J. CLOYD

VALVE

Filed June 29, 1923

1,605,807

WITNESSES

Frederick Diehl.
Hugh H. Ott

INVENTOR
D. J. CLOYD
BY
ATTORNEYS

Patented Nov. 2, 1926.

1,605,807

UNITED STATES PATENT OFFICE.

DAVID J. CLOYD, OF DARWIN, CALIFORNIA.

VALVE.

Application filed June 29, 1923. Serial No. 648,626.

This invention has relation to valves and has particular reference to a valve which is particularly designed for the opening and closing of the intake and exhaust ports of an internal combustion engine, although the same is not necessarily restricted to such a use.

One of the principal objects of the present invention is to provide a rotary valve of this character in which the pressure is equalized on opposite sides of the rotary core of the valve structure whereby wear on the same resulting from pressure being exerted only on one side is eliminated.

Another object of the invention is to provide a valve casing composed of a number of units or parts which are readily adjustable to take up wear and in which the assembling and disassembling of the same is greatly facilitated when necessary for the purpose of repairs or replacements.

As a still further object the invention contemplates a rotary valve which is extremely simple in its construction and mode of operation, inexpensive to manufacture and install and one which is highly efficient in its purpose.

In the drawings—

Figure 2:
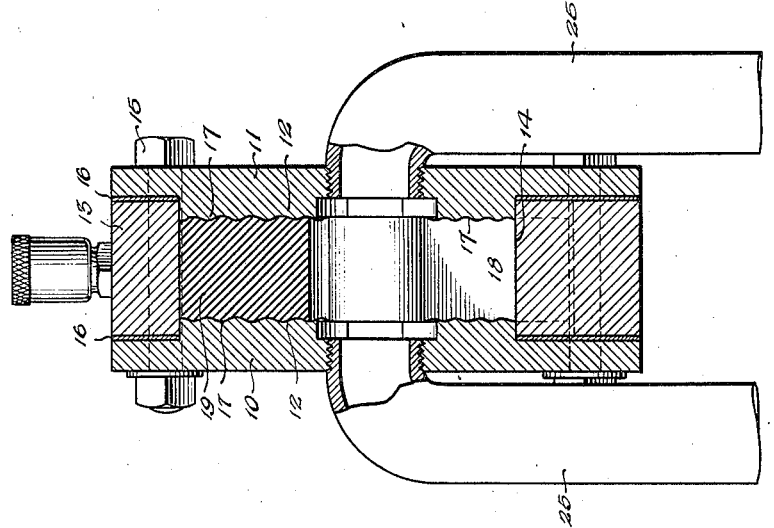
Figure 2 is a transverse sectional view therethrough taken approximately on the line indicated at 2—2 in Fig. 1.
Figure 1:
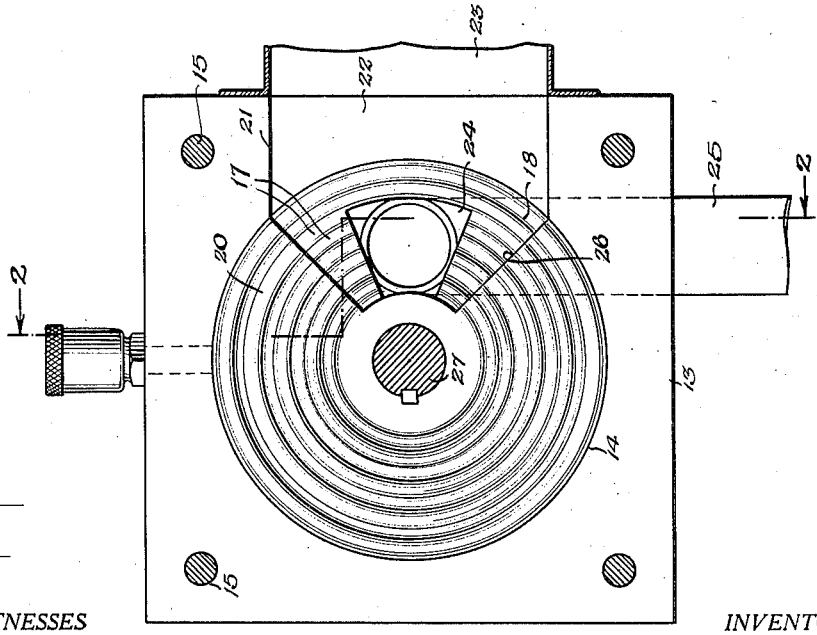
Figure 1 is a side view of the valve with one of the side plates of the valve casing removed and with parts shown in section.

Referring to the drawings by characters of reference, the valve comprises a casing including a pair of spaced plates 10 and 11 of substantially identical construction having circular bosses 12 on the confronting faces. The plates are spaced apart by means of an intermediate element 13 which is formed with a circular opening 14 into which the bosses 12 fit. Clamping devices such as bolts 15 extend through the plates 10 and 11 and the intermediate element 13 while shims 16 are interposed between the side faces of the intermediate element 13 and the inner faces of the plates 10 and 11 for the purpose of regulating the spacing between the confronting faces of the bosses 12. The confronting faces of the bosses 12 are formed with concentric corrugations or undulations 17. The intermediate element 13 together with the plates 10 and 11 define a valve core chamber 18 of circular formation within which a circular valve core 19 is mounted for rotation, said valve core having its opposite side faces provided with complementary concentric corrugations or undulations 20 which snugly fit the corrugations or undulations 17 in the confronting faces of the bosses 12. The intermediate element 13 is cut away as at 21 to provide a passage or port 22 extending from the chamber 18 to the outer edge of the valve casing for establishing communication between a pipe 23 and the chamber 18. The side plates 10 are provided with laterally disposed aligned ports 24 with which the branch pipes 25 communicate. The valve core 20 is cut away preferably in segmental form as at 26 whereby said cutaway portion during a part of the revolution of the valve core establishes communication between the ports 22 and 24 and the pipes 23 and 25, while during the remainder of the revolution the said ports are out of communication. The valve is preferably keyed or otherwise secured to a transverse shaft 27 which extends through the casing and the valve core.

As heretofore set forth the valve is especially designed for the purpose of controlling the opening and closing of the intake or exhaust port of an internal combustion engine. When employed for controlling the intake of an internal combustion engine the pipes 25 both lead into the combustion chamber of the engine cylinder, not shown. The pipe 23 will lead from the source of fuel supply preferably from the intake manifold. During the intake stroke the cutaway portion 26 of the valve core will register with the ports 22 and 24 whereby the fuel will be drawn inwardly from the pipe 23 through the port 22, the cutaway portion 26, the ports 24 and pipes 25 into the combustion chamber. When the piston in the cylinder reaches the downward limit of its stroke and starts upwardly on its compression stroke the cutaway portion will have reached a point to cut off communication between the ports 22 and 24 and the pipes 23 and 25. The pressure traveling through the pipes 25 will be equally distributed on the opposite side faces of the valve core 19, thus in no way effecting an axial movement of the valve core against the confronting faces of the bosses 12. Where a valve of this character is employed as an exhaust valve the action is identically the same and the pressure during the explosion and exhaust strokes of the piston is equalized on opposite faces of the valve.

The corrugated or undulated surfaces 17 will function to reduce leakage to a minimum without the necessity of employing packing, gaskets or the like. Wear may be taken up by removing one or more of the shims 16, when desired.

From the foregoing it will thus be seen that an extremely simple and highly efficient form of rotary valve has been provided in which pressure is equalized to avoid undue wear on the moving and coacting parts of the valve core and casing.

I claim:

A valve including a casing comprising side plates having circular bosses on the confronting inner faces thereof, said bosses having concentric corrugations, a spacing element therebetween having a central circular opening therethrough into which the bosses of the side plates extend to define a circular valve core chamber, the said spacing element having a port extending out through one edge and the said side plates having laterally aligned ports therein, and a circular valve core mounted to rotate in said chamber in a plane at right angles to the alined ports of the side plates, said valve core having on its side faces concentric corrugations and a segmental cutaway portion in its periphery adapted during a part of its cycle of rotation to establish communication between all of said ports while serving during the remainder of its cycle of rotation to cut off communication therebetween, the said laterally disposed aligned ports being designed to communicate with the same member in which pressure is created whereby the pressure will be equalized on both sides of the valve core.

DAVID J. CLOYD.